Patented Sept. 21, 1948

2,449,547

UNITED STATES PATENT OFFICE 2,449,547

LUBRICATING OIL ADDITION AGENT

Gordon D. Byrkit, Niagara Falls, N. Y., assignor, by mesne assignments, to The Lubrizol Development Corporation, Cleveland, Ohio, a corporation of Delaware No Drawing. Application October 21, 1942, Serial No. 462,837

10 Claims. (Cl. 260—408)

My invention relates to an addition agent for lubricating oils and to an improved lubricating oil formed therefrom.

This application is a continuation-in-part of my copending applications, Serial No. 226,966, filed August 26, 1938, now Patent No. 2,309,336, and Serial No. 358,303, filed September 25, 1940, now Patent No. 2,300,403.

Present-day mechanical devices require lubricating oils of high film strength. It has been found that the highest quality straight hydrocarbon lubricants have a film strength insufficient for efficient use in present-day mechanical devices. High quality straight hydrocarbon lubricants used under conditions of high pressure, low speed and/or high temperatures have a tendency to break down due to their low film strength. With high pressures between the rubbing surfaces, the body of the lubricant is squeezed out and only a thin film remains. It is readily seen that with a low film strength lubricant there is a tendency for the lubricant to break down, decompose, and allow the rubbing surfaces to come in contact and cause seizure.

It is well known that mineral lubricating oils are deficient in oiliness, which is the most important character of the lubricant when used under conditions of boundary lubrication where the viscosity of the lubricant plays little or no part. Boundary lubrication conditions are obtained when engines are operating at heavy loads, low speed, or if for any reason the supply of lubricant is cut off or not sufficient. This last condition may exist when for mechanical reasons the lubricant pump is not functioning properly or when the lubricant feed line is clogged with foreign matter.

In starting idle mechanical equipment which is lubricated from a sump by pumping or circulating the lubricant, there is always a short period of time in which the rubbing surfaces must operate under conditions of dry friction if ordinary hydrocarbon lubricants are used. With dry friction the wear on friction surfaces is extreme; and during cold weather, when the lubricant is sluggish or during periods when the lubricating system is not functioning properly for one reason or another, rubbing surfaces may not only suffer considerable wear but may be damaged to the point where they must be replaced. By means of my invention, it is possible to produce a material, which when blended with hydrocarbon lubricants has the very important property of reacting with the metal surfaces, penetrating and/or absorbing on the metal, leaving a film of lubricant with high oiliness characteristics, which remains on the metal surface irrespective of the length of time the machine has been idle. This high oiliness film gives very smooth operation, which may be easily discerned by the experienced operator and lubricating engineer.

One object of my invention is to provide materials, which when added to mineral lubricating oils improve their oiliness and load-carrying ability and enable the oil to lower the friction between the rubbing surfaces.

Another object of my invention is to provide a material, which when blended with the hydrocarbon oils will produce a lubricant which will maintain a very low coefficient of friction when diluted with light hydrocarbons such as are obtained in an automobile crankcase by incomplete combustion of the fuel.

A further object of my invention is to provide a material which when blended with hydrocarbon lubricants will confer upon it penetrative lubricity characteristics. It has been found that by my process a lubricant is produced which does not drain off the rubbing surfaces when idle, thereby providing a lubricating film on the rubbing surfaces at all times and being of great value to the life of the machine in cold weather starting, when the lubricant is very stiff and sluggish.

A still further object of my invention is to provide a material, which when blended with a lubricant enables it to produce a more nearly constant coefficient of friction, thereby insuring smoother engine operation.

It is well known to the art that the addition of certain chlorinated or otherwise halogenated organic materials to mineral lubricants improves the character of the latter in these various respects. For example, U. S. Patent 1,944,941, issued to Bert H. Lincoln and Alfred Henricksen on January 30, 1934, describes a lubricating oil comprising in combination a hydrocarbon oil and a small quantity of certain halogenated esters, which improve the oiliness and load-carrying ability of the mineral oil, confer upon it penetrative lubricity characteristics and enable it to reduce the coefficient of friction between rubbing surfaces.

I have found that material excellently suited for the purpose of improving these characteristics of hydrocarbon oil may be obtained by the interaction of certain chlorinated or otherwise halogenated waxy esters with anhydrous metal salts of organic acids. These waxy esters may be naturally occurring, such as carnauba wax, or synthetic, such as octadecyl stearate. Such materials as these may be chlorinated or otherwise halogenated by direct treatment with the halogen at ordinary or elevated temperatures.

In the specification and appended claims, I mean by the term "waxy esters" to include only the more or less pure esters of organic acids, which are soft to hard solids at ordinary temperatures. I mean to include all the naturally occurring waxes, such as carnauba, beeswax, candelilla, bayberry, Chinese wax, coca wax, cottonseed wax, cow-tree wax, flax wax, Ghedda, gondang, Japan, montan, Ocuba, palm, pisang, raphia, rose, sugar cane, wool wax, and spermaceti as well as synthetic waxes of the ester type, such as octadecyl stearate, and the like; but I do not mean to include petroleum hydrocarbon wax. The ester type waxes are so far superior to the hydrocarbon waxes for the purposes of my invention that they are not to be considered in the same category. The large number of ester groups present in the products of my invention render them especially suitable for the uses described herein.

In the prior art, references are made to monochloro compounds, dichloro compounds, trichloro compounds, and the like, as if these products were the result of direct chlorination of the compounds to the desired chlorinated product. I have found that these materials are crude mixtures of chlorinated waxes and invariably contain unchlorinated esters, monochlorinated esters, dichlorinated esters, and polychlorinated derivatives. On crystallizing these crude chlorination mixtures from an organic solvent or mixtures of organic solvents, for example, acetone, the least soluble portion consists of unchlorinated wax. The next least soluble portion consists of monochloro wax. The next portion consists of dichloro wax and so on.

In carrying out the method of my invention, the use of a crude mixture of chlorinated waxes will not give the same results as a homogeneously chlorinated wax. Even though the appropriate amount of chlorine is introduced into a wax to form a monochloro wax, the crude chlorination mixture will contain in addition to small amounts of chlorine and hydrogen chloride and the desired monochlor wax, unchlorinated wax and more highly chlorinated waxes.

I have found that, on introducing chlorine into the higher waxy esters, the formation of the di- and higher polychlor waxes begins when only 5 per cent by weight of chlorine has been introduced. This formation of di- and higher polychlor waxes proceeds more rapidly than the chlorination to the monochlor compound so that the proportion of the latter in a crude chlorinated mixture decreases rapidly and is at a maximum when about 10 per cent of chlorine has been introduced. At this point, a typical chlorinated mixture will contain about 25–30 per cent of unchlorinated wax, 40–50 per cent of monochlor wax, and about 20–25 per cent of dichlor wax, as well as higher chlorinated waxes. Even when as much as 24 per cent by weight of chlorine is introduced into a wax, about 10 per cent of unchlorinated wax is still present in the mixture. The removal of unchlorinated wax from the crude chlorinated mixture is the first step in preparing homogeneous monohalogen compounds and higher halogenated compounds, but it will be obvious that the chlorine compounds, when separated from the unchlorinated wax form a crude mixture of waxy esters in various stages of chlorination.

The chlorination of most waxy esters lowers their melting points and, to a certain degree, the greater the extent of chlorination, that is, the more chlorine atoms per molecule, the lower the melting point. The decrease in melting point is stepwise. This permits me to separate unchlorinated waxes from the monochlor waxes, the monochlor waxes from the dichloro waxes, and the dichloro waxes from the trichloro waxes. In the appended claims I refer to these purified halogenated waxes as homogeneously halogenated waxy esters, i. e., those halogen containing materials whose melting points lie within a relatively narrow temperature range and which are present in the mass produced by halogenation of a waxy ester.

Having selected the wax in accordance with the desired final product, I chlorinate the wax until approximately that amount of chlorine is absorbed which will produce monochlor compounds, if these are desired, or larger amounts of chlorine to produce di- and higher poly-chloro waxes when these products are desired. For example, in the manufacture of a monochloro wax containing 18–24 carbon atoms per molecule, I select a wax having a melting point of approximately 120 degrees F. I introduce into this wax about 10 per cent of added chlorine which will form a mixture containing as an average about the same weight of chlorine as the monochlor product. This may vary from not less than 8 to not more than 12 per cent, without being disadvantageous. The percentage of chlorine introduced into the wax will be less in the case of the higher molecular weight waxes. The chlorination may be accomplished by any suitable method and any appropriate apparatus. I prefer to melt the wax and agitate thoroughly, while the chlorine gas is introduced into contact therewith so as to be well distributed through the liquid. The heat of reaction is ordinarily ample to maintain the mixture in the liquid state without further heating. I make provision for the escape of quantities of hydrogen chloride gas which are evolved and for unreacted chlorine. When a sufficient quantity of chlorine has been introduced, I blow the mixture with air or other inert gas, such as carbon dioxide, until the hydrogen chloride and free chlorine are substantially removed.

Even though the appropriate amount of chlorine is introduced into the wax to form a monochlor wax, as I have pointed out above, it will be found that the crude chlorination mixture contains in addition to the by-product hydrogen chloride and the desired monochlor wax, also unchlorinated wax and more highly chlorinated waxes.

The unchlorinated wax is separated from the air-blown mixture by pressing at such temperature that the chlorinated waxes are largely liquid and the unchlorinated wax is mostly solid. The appropriate temperature to which the mixture must be chilled before the pressing operation begins will depend upon the character of the waxy ester used initially and may vary considerably. For example, when a wax having a melting point of 120 degrees F. is used as the starting material, a temperature of about 80–90 degrees F. is suitable for the separation of unchlorinated wax from the mixture.

Other separation processes, for example, sweating, may be employed to separate the solid, unchlorinated wax from the liquid chlorinated waxes.

The liquid chlorinated waxes will consist largely of monochlor wax and dichlor wax. These may be separated by crystallization from acetone or any other suitable solid, using a solvent-chlor wax ratio of from 1 to 1 to 20 to 1. The solution is prepared by warming and is then chilled to approximately minus 15 degrees to minus 20 degrees F. to precipitate the chlorinated waxes which are then removed by filtering, pressing, settling, or in any other suitable manner.

The monochlor wax is precipitated out of the solution nearly quantitatively and its separation from the dichlor and polychlor waxes present is readily accomplished.

Instead of acetone, such selective solvents as methyl-ethyl ketone, acetone-benzene mixtures, acetone-methylene chloride mixtures or various halogenated solvents may be employed. It will be obvious that the quantity of solvent and the temperature to which the solution should be chilled will depend upon the particular materials being processed and may be readily determined empirically. The halogenated solvents serve to aid in the precipitation of unchlorinated waxes, while benzene increases the solubility of the more highly chlorinated materials.

Any of the relatively pure chlorinated waxes may be used in carrying out my invention. One of these waxes is condensed with the anhydrous metal salt of an organic acid. The organic acid may be of any type; that is, aliphatic, aromatic, or heterocyclic or may belong to more than one of these classes. I have found that the use of halogenated organic acids for this purpose gives products which are particularly efficient in improving the characteristics of mineral lubricating oil when blended with them. The chosen organic acid is converted to the sodium salt or other metallic salt by means of neutralization with a suitable base, such as sodium hydroxide, barium hydroxide, etc., and rendered anhydrous by intensive drying or, if necessary, fusion.

My condensation products are of several types depending on the structure of the starting materials:

A. *Diesters from monohalogenated esters*

These are of three types, depending on the position of the halogen.

1. Halogen in the acid radical:
These esters are of the type $$RCH(O.CO.R')(CH_2)_nCO_2R''$$

derived from the metal salt R'COOM and the monochloro-ester, RCHCl(CH₂)ₙCO₂R''. R may be H or an organic radical; n may be zero or any integer. These esters are distinguished in that they hydrolyze to form an alcohol, R''OH, an acid, R'CO₂H, and a hydroxy acid $$RCHOH(CH_2)_nCO_2H$$

Examples of monohalogenated esters which may be used are:

a. Octadecyl alpha bromostearate
 b. Monochloro-carnauba wax
 c. Monochloro-beeswax 2. Halogen in the alcohol radical:
These esters are of the type, RCO₂R'O.CO.R'', derived from the metal salt R''CO₂M and the monochloro-ester, RCO₂R'X in which R' is a divalent 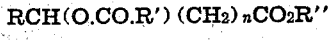 nic radical. These esters are distinguished in that they hydrolyze to form two acids, RCO₂H and R''CO₂H and a glycol, R'(OH)₂ which may be vicinal or disjoined depending on the position of the halogen.

Examples of monohalogenated esters which may be used are:

a. Beta-chloroethyl stearate
 b. Monochloro-octadecyl stearate
 c. Monobromo-carnauba wax B. *Esters from dihalogenated esters*

These are of three classes containing several types depending on the position of the halogen atoms.

1. Both halogens in the alcohol radical:
These esters are of the type $$RCO_2R'(O.CO.R'')_2$$

in which R' is a trivalent organic radical. The esters are derived from the dichloro-esters $$RCO_2R'Cl_2$$

These esters are distinguished in that they hydrolyze to form two acids, RCO₂H and R''CO₂H, and a trihydroxy organic compound R'(OH)₃ or a hydroxyketone. Examples of dihalogenated esters which may be used are:

a. 2,2-dichloroethyl stearate
 b. Dichloro-carnauba wax
 c. Dichloro-candelilla wax 2. Both halogens in the acid radical:
These esters are of the type, (RCO₂)₂R'CO₂R'', in which R' is a trivalent organic radical. The dichloro-esters from which these are derived have the formula R'Cl₂.CO₂R''. These esters are distinguished in that they hydrolyze to form an alcohol, R''OH, an acid, RCO₂H, and a dihydroxyacid R'(OH)₂CO₂H or a keto-acid if both halogens were originally on the same carbon atom. Examples of dihalogenated esters which may be used are:

a. Methyl alpha, alpha-dichlorostearate
 b. Dichloro-beeswax
 c. Dibromo spermaceti
 d. Methyl alpha, beta-dichlorosterate
 e. Ethyl cinnamate dibromide
 f. Methyl alpha, iota-dichlorostearate 3. One halogen in each radical:
These esters are of the type $$RCO_2R'CO_2R''.O.COR$$

in which R' and R'' are divalent organic radicals. The starting chloro-esters have the formula R'Cl.CO₂R''Cl. These esters are distinguished in that they hydrolyze to form an acid, RCO₂H, a hydroxyacid, R'(OH)CO₂H, and a glycol, R''(OH)₂ which may be vicinal or disjoined depending on the position of the original halogen atoms.

Examples of dihalogenated esters which may be used are:

a. Beta-chloroethyl alpha-chlorostearate
 b. Gamma-chloropropyl iota-chlorostearate
 c. Dichloro-candelilla wax C. *Esters from polyhalogenated esters*

These are, in general, mixtures of the above types.

The products of my invention may or may not contain halogen from one or both of two sources depending on the starting materials and their treatment. The halogen compound may be treated so as to remove all or only part of the halogen. Furthermore, the acid whose sodium or other metal salt is used in the condensation may or may not contain halogen itself. Halogen from this source will remain in the final product. For example, I may use sodium o-chloro-benzoate as a reagent or I may use a chlorwax containing 23 per cent halogen and treat it with insufficient quantities of metal salt or for insufficient time or at too low a temperature to remove all the halogen from the chlorwax.

For use in lubricating oils, it is desirable that the compounds employed should have a vapor pressure of less than atmospheric at a temperature of about 250 degrees F. Compounds having this vapor pressure will not vaporize during use in an internal combustion engine or as a crankcase lubricant.

The condensation of the chlorinated wax with the anhydrous sodium salt is effected by heating these two components in the presence of small amounts of an acid anhydride and a tertiary base, such as pyridine, or dimethylaniline. If the organic acid used is cheaply available in the form of the anhydride, that anhydride is preferably used as a condensing agent; thus, for example, if acetic acid is used to prepare the anhydrous sodium salt, then acetic anhydride is preferably used as the condensing anhydride; however acetic or any other cheaply available acid anhydride is suitable to effect the condensation.

The use of a tertiary base, such as pyridine or dimethylaniline, serves to increase the rate of reaction between the components so as to effect the condensation in a shorter time. In general, the condensation is effected by heating the components to a temperature of from 100 to 200 degrees C., usually about 140 degrees C. for 8 to 16 hours; however, in the presence of the tertiary base, the condensation is completed in a much shorter time; namely, from 4 to 8 hours at this temperature.

The condensation product is separated from the reaction mixture by washing with water and drying the produce by any suitable means, such as, for example, blowing with air at an elevated temperature.

The resulting condensation product is blended with a hydrocarbon oil of any character and the resulting blend is considerably improved in film strength, oiliness and penetrative lubricity characteristics. The coefficient of friction between rubbing metals lubricated by the blend is considerably lower than the coefficient of friction when the straight hydrocarbon lubricant is used.

Various types of lubricants are susceptible to treatment by this invention, including paraffin base, naphthenic base, and/or asphaltic base hydrocarbon oils and other oils of lubricating viscosity, such as animal and vegetable oils, namely, castor oil, sperm oil, cottonseed oil, lard oil, corn oil, and synthetic oils including hydrogenated oils.

Other modes of applying the principle of the invention may be employed, change being made as regards the details described, provided the features stated in any of the following claims or the equivalent of such be employed.

I therefore particularly point out and distinctly claim as my invention:

1. As a hydrocarbon lubricating oil improving agent, a halogen-bearing synthetic material obtained by the condensation of a homogeneously halogenated waxy ester with an anhydrous metal salt of a carboxylic acid, said waxy ester being selected from the class consisting of naturally occurring solid and semi-solid waxy esters and synthetic carboxylic acid solid and semi-solid waxy esters, said homogeneously halogenated waxy ester containing a uniform number of halogen atoms per molecule, and said condensation reaction being carried out with an amount of the anhydrous metal salt insufficient to replace all of the halogen in said homogeneously halogenated waxy ester.

2. An improving agent in accordance with claim 1 in which the halogen is chlorine.

3. A synthesis method for the preparation of addition agents for lubricating oils, including the steps of condensing a homogeneously halogenated waxy ester with an anhydrous metal salt of a carboxylic acid in the presence of an acid anhydride, said waxy ester being selected from the class consisting of naturally occurring solid and semi-solid waxy esters and synthetic carboxylic acid solid and semi-solid waxy esters, said homogeneously halogenated waxy ester containing a uniform number of halogen atoms per molecule, and said condensation reaction being carried out with an amount of the anhydrous metal salt insufficient to replace all of the halogen in said homogeneously halogenated waxy ester.

4. A synthesis method in accordance with claim 3 wherein the condensation step is carried out in the presence of an acid anhydride and a tertiary base.

5. A synthesis method in accordance with claim 3 wherein the anhydrous metal salt of a carboxylic acid is an alkali metal salt.

6. A synthesis method in accordance with claim 3 wherein the homogeneously halogenated waxy ester is octadecyl stearate, the anhydrous metal salt is sodium ortho-chlor benzoate, and the condensation is carried out in the presence of acetic anhydride and pyridine.

7. A synthesis method in accordance with claim 3 wherein the anhydrous metal salt is sodium chloro acetate, and the condensation is carried out in the presence of acetic anhydride and pyridine.

8. A synthesis method in accordance with claim 3 wherein the homogeneously halogenated waxy ester is carnauba wax, the anhydrous metal salt is sodium chloro-acetate, and the condensation is carried out in the presence of acetic anhydride and pyridine.

9. A hydrocarbon lubricating oil-improving addition agent consisting essentially of the halogen-bearing condensation product of homogeneously halogenated octadecyl stearate and sodium ortho-chlor benzoate.

10. A hydrocarbon lubricating oil-improving addition agent consisting essentially of the halogen-bearing condensation product of homogeneously halogenated carnauba wax and sodium chloroacetate.

GORDON D. BYRKIT.

REFERENCES CITED

The following references are of record in the file of this patent:

UNITED STATES PATENTS

| Number | Name | Date |
| --- | --- | --- |
| 1,939,994 | Lincoln | Dec. 19, 1933 |
| 1,939,995 | Lincoln | Dec. 19, 1933 |
| 2,049,207 | Lawson | July 28, 1936 |
| 2,300,403 | Byrkit | Nov. 3, 1942 |
| 2,309,336 | Byrkit | Jan. 26, 1943 |